June 9, 1959 V. J. DUKE 2,890,277

CONTINUOUSLY MOVING FILM SCANNER

Filed May 22, 1953 3 Sheets-Sheet 1

INVENTOR.

Vernon J. Duke

BY [signature]

ATTORNEY

INVENTOR.
Vernon J. Duke
BY [signature]
ATTORNEY

June 9, 1959 V. J. DUKE 2,890,277

CONTINUOUSLY MOVING FILM SCANNER

Filed May 22, 1953 3 Sheets-Sheet 3

INVENTOR.

*Vernon J. Duke*

BY *[signature]*

ATTORNEY

United States Patent Office 2,890,277

Patented June 9, 1959

2,890,277

CONTINUOUSLY MOVING FILM SCANNER

Vernon J. Duke, Rockville Centre, N.Y., assignor to Radio Corporation of America, a corporation of Delaware Application May 22, 1953, Serial No. 356,729

The terminal fifteen years of the term of the patent to be granted has been disclaimed 3 Claims. (Cl. 178—7.2)

The present invention relates to new and improved apparatus for the recording of television information on film and to the re-translation of such recording into television signals of high definition.

More particularly, the invention relates to such apparatus in which the film travels continuously and at a generally constant rate while being scanned, as by a flying spot from a kinescope, for example, and is applicable, by way of illustration, to the system described and claimed in applicant's co-pending application for U.S. Letters Patent, Serial No. 237,467, filed July 18, 1951 for "Video Signal Recording and Image Reproducing Apparatus." In that system, a strip of motion picture film is run at a continuous speed and each television image field is recorded longitudinally of the film strip (i.e., with the television scanning lines parallel to the strip), thus affording a recording capable of being reproduced with extremely high detail. When the film motion in the above and other types of continuous motion film recording apparatus is not uniform, there results a displacement of the recorded raster on the film with respect to its sprocket perforations. Moreover, even assuming that the television rasters are properly located on the film during the recording step, any non-uniformity of motion during "playback" will produce a picture "shift."

It is, therefore, a principal object of the present invention to provide means for eliminating, in a video recording or reproducing system, any non-uniformity of image location which might otherwise result from erratic film speed.

Another and more specific object hereof is that of providing means for improving television image recording and reproduction, whereby no picture "shift" or "jump" is produced.

Still another object of the invention is the provision of means for causing a cathode ray tube scanning beam to assume a proper and predetermined location on a continuously moving film strip, despite non-uniform movement of the latter.

In general, the present invention contemplates the substantial elimination of "raster jump" by sampling the position of each sprocket hole of the film and making a time-position comparison of the samples with regularly recurring electrical signals such as the vertical (field) driving pulses from the scanning tube's deflection circuits. Variations indicated by the comparison are then converted to an appropriate electrical waveform which is applied to centering means associated with the tube in order to re-position its raster properly in relation to the perforations. In accordance with one embodiment, the above and other aims are accomplished through the agency of a light source and a light-sensitive device for detecting the position of the film sprocket holes, a circuit for comparing the information thus obtained with the field driving pulses from the sweep circuits associated with the scanning tube, and circuits which transform this comparison information into a form suitable for centering the raster to conform to a desired location on the film, regardless of variations in the rate of motion of the latter.

Thus, it is another object of the invention to provide means for detecting the position of recurring indicator points on continuously moving motion picture film whereby an indication of the rate of film travel is furnished.

A further object is the provision of means as set forth wherein such detected information regarding the film rate is compared with a standard electrical signal such as to indicate variations in the rate of film travel from a desired norm.

A still further object of the invention is that of providing means, in a video recording or playback system, for maintaining a scanning raster centered properly with respect to continuously moving film, despite erratic speed of the latter.

Yet another object is the provision of means of the type described wherein the centering energy is produced by a comparison of the scanning tube's deflecting signals with signals resulting from continuously detecting the position of the film with respect to a reference.

Additional objects and advantages of the present invention will become apparent to those skilled in the art from a study of the following detailed description of the accompanying drawings, in which.

Figures 1, 2, 3:
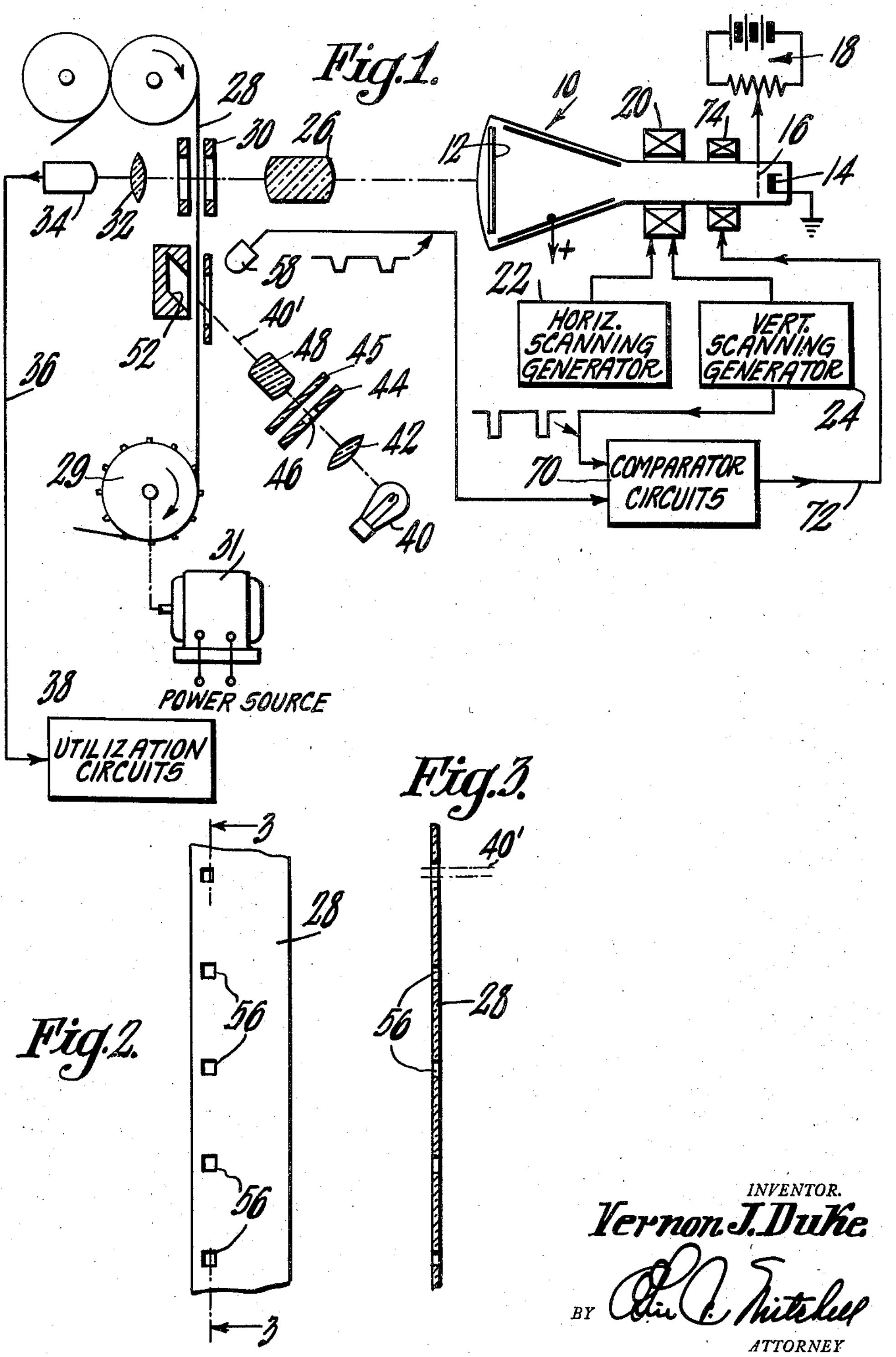
Fig. 1 illustrates, by way of block diagram, one form of the invention.
Fig. 2 is a fragmentary showing of a strip of motion picture film such as might be employed in the apparatus of Fig. 1.
Fig. 3 is a sectional view taken along line 3—3 in Fig. 2.
Figure 6A:
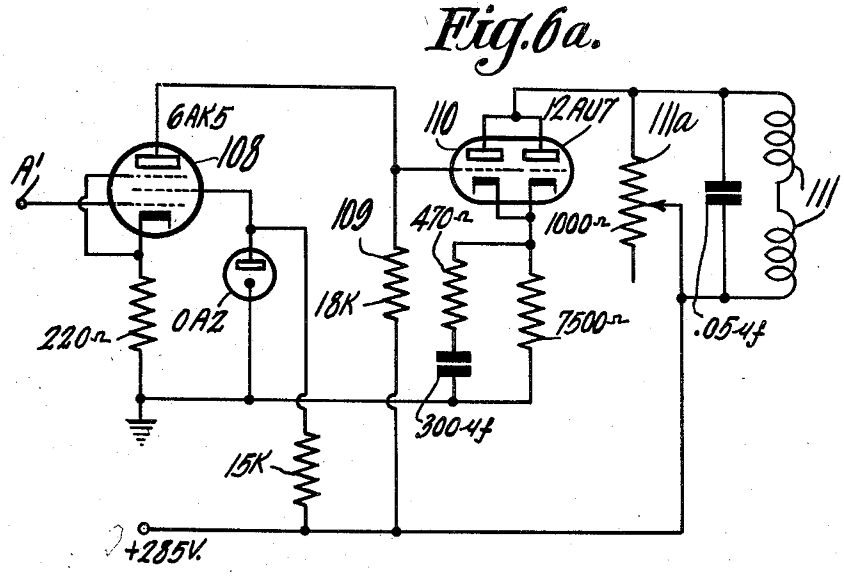
Figure 6:
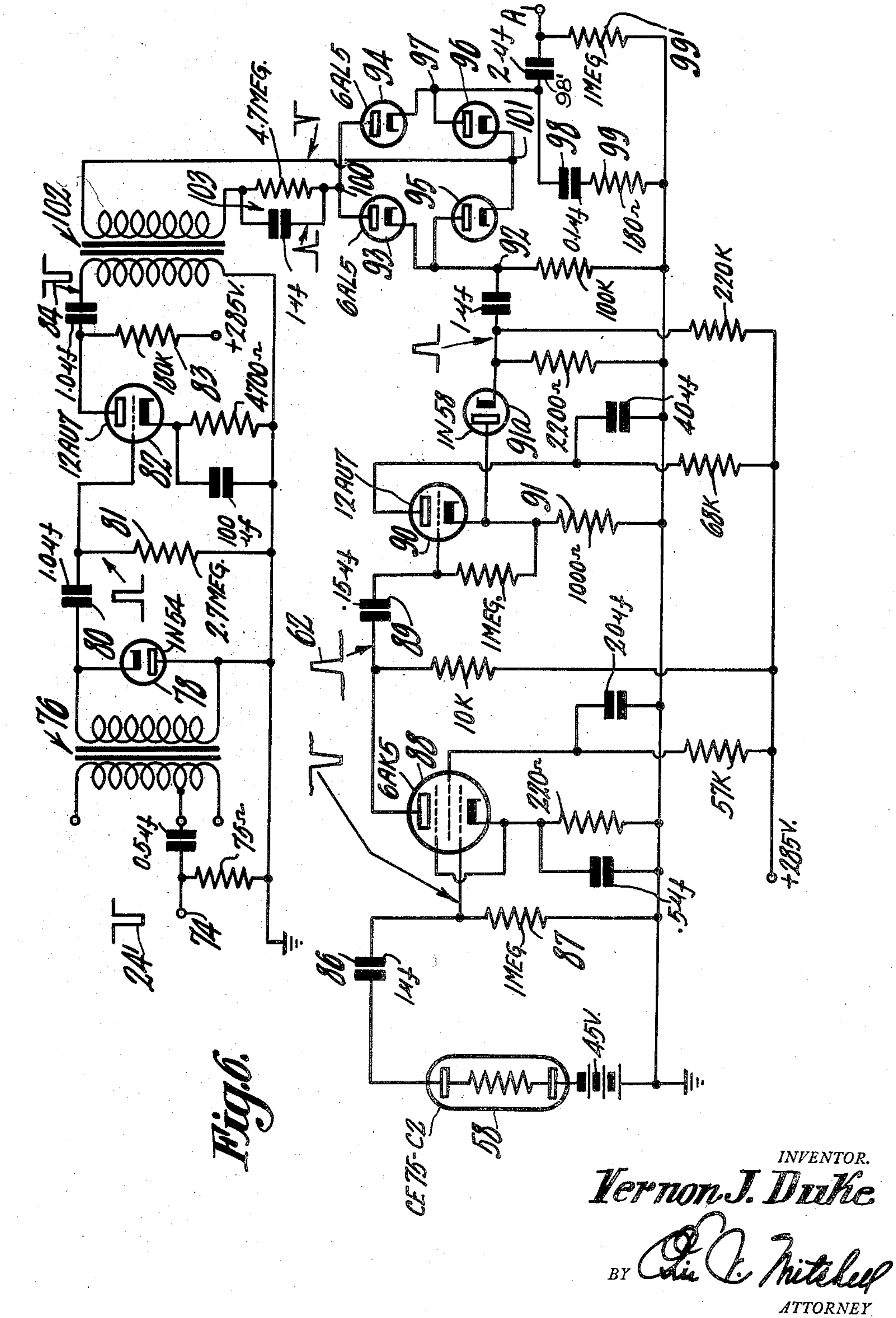

Fig. 6 and 6*a* illustrate, by way of schematic diagram, a circuit which may be employed in the system of Fig. 1.

Referring to the drawings and, particularly, to Fig. 1 thereof, there is shown, by way of example, apparatus suitable for "playing back" a television recording of the type employing continuously moving film and which may, for example, be of the variety disclosed in the above cited co-pending application. More specifically, reference numeral 10 indicates a cathode ray tube such as a "kinescope" on whose luminescent screen 12 there is produced a scanning raster of light. Since the tube does not constitute a part of the present invention, it is not shown in detail, beyond the diagrammatic illustrations of a cathode 14 and a control electrode 16 which is or may be connected to a suitable bias source such as the potentiometer 18. Associated with the kinescope 10 are horizontal and vertical deflection coils 20 which are adapted to cause a beam within the tube (not shown) to scan a generally rectangular raster, the coils 20 being connected to suitable sources of horizontal and vertical scanning waveforms 22 and 24, respectively, which may be of any conventional variety. Light from the kinescope face 12 is focused by means of an optical system indicated diagrammatically at 26 onto the film 28 within the gate 30 and, being modulated as to intensity by the varying densities of the film is focused via lens 32 onto a light-sensitive device 34 which may, for example, be of the photomultiplier type conventionally employed in this environment. The output of the photomultiplier tube is illustrated as being coupled by lead 36 to a utilization device 38 which may, by way of illustration, constitute a conventional television transmitter. The film is or may be caused to travel at a generally constant rate by means of a sprocket 29 driven, for example, by an electric motor 31.

As thus far described, the apparatus of Fig. 1 is in conformity with conventional techniques. The system, however, further includes a light source 40 and a condenser lens 42 which, in conjunction with a plate 44 having a rectangular aperture 46, produces a rectangular cross-section beam of light which is imaged, via a lens system 48, onto the film 28 as it passes through an auxiliary gate 50. The rectangular spot of light is, in accordance with the present invention, focused on the film in such a postion that it can fall completely within each of the sprocket holes of the film as it passes the gate 50. A light sump 52 which may comprise a black sump hole capable of absorbing light is disposed behind the film gate 50 in line with the axis of the optical system 48.

A strip of motion picture film is conventionally shown at 28 in Fig. 2 and is provided with rectangular sprocket holes 56 which are adapted to be engaged by the teeth of the sprocket wheel 29 of Fig. 1 in a well known manner. The spot of light produced by the lamp 40, lens 42 and aperture 46 of Fig. 1 is similarly rectangular and should have dimensions slightly smaller than those of the sprocket holes so that, as shown in Fig. 3, the light beam 40' is capable of falling completely within a sprocket hole. In order to prevent possible "fogging" of the film edge in the region of the sprocket holes by the light spot, a filter 45 (in Fig. 1) such as a Wratten gelatin filter (Eastman, Kodak Specification No. 16) may be located in the path of the light from lamp 40. Also shown in Fig. 1 is a photoconductive cell 58 which is disposed at an angle to the film 28 and in such relation to the gate 50 as to receive light reflected by the film as it passes through the gate. The cell employed should, in view of the filter 45, be one which is quite sensitive in the low red region. The precautions illustrated as a means for preventing fogging of the film by the sprocket hole detecting light beam, pre-supposes that the film is of the type which is primarily sensitive in the blue and green region, as will be appreciated by those skilled in the art.

In view of the foregoing, it will be understood that, as the film 28 travels continuously past gate 30, it will be scanned by the light emanating from the kinescope 10 in such manner as to "read off" the lines of video information placed thereon during the recording process. Moreover, the rectangular beam from source 40 which strikes the film edge obliquely will be reflected by the film to photocell 58 except when a sprocket hole falls in the path of the beam, at which time the beam will be absorbed by the sump 52. The output of the photocell, therefore, will be a waveform such as that illustrated in Fig. 4 wherein, as indicated, the voltage level 60 is or may be that resulting from the maximum reflected light from the film edge (in the absence of a sprocket hole), with negative going pulses 62 occurring during the passage of the sprocket holes 56. Each pulse 62 has sloped leading and trailing edges 64 and 66, respectively, which are indicative of the rate of cut-off and increase of light to the device 58 as a sprocket hole passes by. The waveform of Fig. 4, therefore, is particularly significant in several respects. By way of summary, the portion 60, occurring during time $T_1$, corresponds to intervals between sprocket holes when the light beam is reflected by the film. Secondly, the short duration, horizontal portion 68 indicates the time elapsed during which such light was passing through the sprocket hole and this latter time lapse corresponds, in turn, with the difference in width between the rectangular light spot and the sprocket hole as interpreted as a function of film travel. Thirdly, the slopes 64 and 66 occur during time $T_2$ (i.e., during the passage of a sprocket hole) are substantially straight by reason of the rectangularity of the light spot and sprocket holes, so that their time duration is equal to the width of the light spot in terms of film travel time. Moreover, it will be appreciated that the average distance between the recurring pulses 62 is equal to the average rate of film travel. If, however, there occurs a variation in the speed of the film driving mechanism or in the spacing of the sprocket hole punching (as by film shrinkage), the pulses 68 will occur at a correspondingly different rate.

Figure 4:
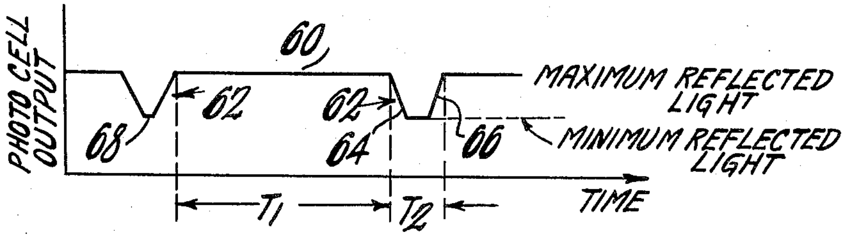
Fig. 4 is a waveform illustrative of signals relating to film sprocket hole positioning.

In accordance with the principles of the present invention, these foregoing features of the waveform of Fig. 4 are employed to insure proper centering of the scanning raster from kinescope 10 with respect to the film even in view of variations in film velocity. This aim is realized by comparing the phase of the pulses 62 with their sloping sides 64 and 66 with the vertical or field driving pulses employed by the scanning circuit 24 in conjunction with the deflection coils 20, the comparison being conducted by suitable circuitry denoted by the block 70 in Fig. 1. That is to say, the waveform of Fig. 4 is coupled from the light-sensitive device 58 to the input of the comparator circuits 70 simultaneously with the vertical driving pulses from the scanning generator 24. As will appear more fully hereinafter, the output of circuit 70 will comprise a current waveform which is a measure of the height of the slope 64 at the time of each of the vertical driving pulses and is fed via lead 72 to the centering device 74 which may comprise an electromagnetic coil associated with the neck of the kinescope 10.

Figs. 6 and 6*a* illustrate schematically a circuit which has been employed successfully in effecting the stated objectives of the invention, values for the various components being indicated on the drawing merely by way of illustration. Specifically, the terminal 74 is or may be connected to the vertical scanning generator 24 of Fig. 1 to receive the vertical driving pulses 24' which are coupled via transformer 76 to the input of the comparator circuits. Across the transformer is a diode 78 which has as its function that of clipping the pulses 24' in order to provide a unidirectional pulse from the somewhat differentiated output of the transformer secondary. The clipped pulses, which are several volts in amplitude, are applied via coupling capacitor 80 and grid resistance 81 to the control electrode of a triode 82 which is, as shown, a conventional cathode-biased amplifier having a plate load resistor 83 across which appear amplified pulses 84. The photocell 58 produces the pulses of Fig. 4, which are coupled via capacitor 86 and resistor 87 to the control electrode of a pentode amplifier 88 which is illustrated as connected in a conventional manner. The output of amplifier 88 is coupled via capacitor 89 to the control electrode of a cathode output amplifier 90, thus making available across resistor 91 a voltage corresponding to the waveform of Fig. 4 which is, in turn, applied to terminal 92 of a four diode, bridge-type keyed clamp circuit which may be of the form described in detail in U.S. Patent No. 2,358,545 granted September 19, 1944, to K. R. Wendt for "Television Systems" and assigned to the assignee of the present application. A crystal diode **91*a* connected between the cathode of tube 90 and terminal 92 serves to clip off the long base of the wave 62 which may contain ripple resulting from unwanted variations in reflection effects from the film or from film identification printing. The clipping is performed by using the "tip" 68 (zero reflected light) as a convenient and accurate reference. The bridge comprises the four diodes 93, 94, 95 and 96 connected as shown, the output of the bridge being indicated by terminal 97 to which are connected capacitors 98 and 98' and series resistors 99 and 99'. Across the diagonally opposite terminals 100 and 101 is coupled the secondary of a transformer 102 whose primary is in the plate circuit of amplifier 82. The connection to terminal 100 includes a self-biasing circuit 103** comprising a parallel resistor and capacitor.

Figure 5:
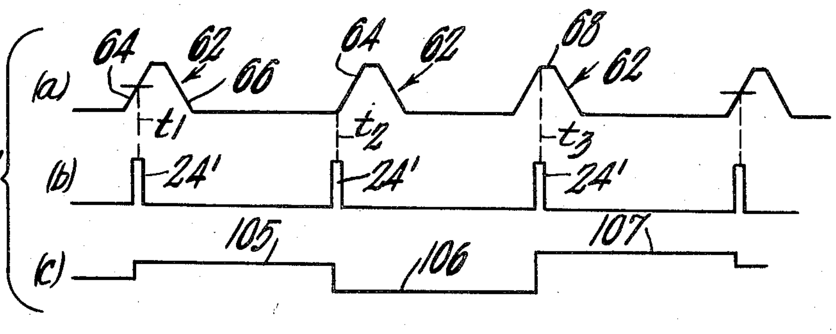
Fig. 5 illustrates several waveforms to which reference will be made infra.

Since the operation of the bridge circuit is described in detail in the above-cited Wendt patent, it is sufficient here to note that pulses applied across terminals 100 and 101 of the bridge serve to key the bridge during their occurrence, so that the pulses 62 applied to terminal 92 are "measured" by the bridge. That is to say, as shown in Fig. 5, waveform (*a*) illustrates the input to terminal 92 and includes pulses 62 having sloped leading and trailing edges 64 and 66, the slope being indicative of the width of the light spot in terms of film travel time, as explained supra. Waveform (*b*) is illustrative of the keying pulses applied to the opposite terminals of the bridge and corresponding in time to the vertical driving pulses 24'. Depending upon the instantaneous value of the sloping edge 64 of pulse 66 at the time the bridge is keyed by spike 24', the output of the bridge as it appears across the resistor-capacitor combination 99, 98 will have a form such as that shown in a somewhat idealized manner by waveform (*c*) of Fig. 5. Thus, for example, where the first spike 24' of Fig. 5 (*b*) occurs at substantially the middle of the slope of pulse 62 (time $t_1$), the output of the comparison network will be a voltage having the level 105 in Fig. 5 (*c*) which is of intermediate magnitude. Similarly, if the spike 24' keys the bridge at the bottom of the slope 64 of pulse 62 (time $t_2$), the control voltage resulting will have a lower value such as that shown at 106. Conversely, time $t_3$ illustrates a situation in which the bridge is keyed when the pulse 62 is at its maximum value 68, such that the control voltage of Fig. 5 (*c*) has a maximum amplitude 107.

The waveform of Fig. 5 (*c*) appearing at point A of Fig. 6 is D.C.-coupled to point A' of Fig. 6 (*a*) which is the input of a pentode amplifier 108 whose cathode is unbypassed and which has a load resistance 109 in its plate circuit. The amplified voltage appearing across resistor 109 is D.C.-coupled to the control electrode of a parallel-connected double triode 110 which directly drives the centering coils 111 comprising the centering device 74 of Fig. 1. Where a low impedance source for the coils 111 is considered important, the coils 111 may be driven from the cathode of amplifier 110 which, of course, will provide a certain amount of cathode degeneration. A potentiometer 111 (*a*) across the coils 111 is further provided as an adjustment for the centering correction voltage.

The waveform of Fig. 5 (*c*) produces a corresponding current in the coils 111 which serves to re-center the scanning raster of kinescope 10 for detected "mis-positioning" of the sprocket" of the sprocket holes with respect to the rectangular light spot from lamp 40 as a function of film travel rate, as will be appreciated from the foregoing discussion, so that, where film travel changes in rate from the norm, the raster of the kinescope may be shifted forward or backward in order to compensate for the changed film speed, thus insuring proper positioning of the raster lines on the film.

While the operation of the invention has been illustrated as a "playback" apparatus, those skilled in the art will understand that it is equally efficacious during the recording of a television image. In the latter situation, the video signal to be recorded would be applied, for example, to the cathode 14 of the kinescope 10, and the lens 32, photomultiplier 34 and utilization circuits would be eliminated from the operation of the system. The sprocket hole detecting system including lamp 40 and its associated optical system, together with the photocell 58 and comparator circuits 70 would, however, function in exactly the same manner as that described above. It will, moreover, be understood that, while a single specific circuit for accomplishing the function of the block 70 has been shown by way of illustration, various changes in the circuitry will occur to those skilled in the art and, for that reason, the illustrative example should not be construed as in any way limiting. For example, although the waveforms of Fig. 5 indicate a comparison of the vertical driving pulses with the leading edge of the photocell output pulses, comparison may be made with equal facility in conjunction with the trailing edges of those pulses.

Also by way of summary, it may be noted that while, for example, the film scanning system of the above-cited Duke pending application provides for scanning each television field on a separate field frame which would require a film speed of 60 frames per second, the invention is equally applicable for use in systems involving different film rates. Thus, if the invention were employed in a 24 film frame-per-second arrangement, the film rate could be compared with the vertical field rate of the kinescope by suitably multiplying the field frequency by two and dividing by five to produce spikes or keying pulses having a repetition rate equal to that of the desired film rate.

Moreover, the invention should be considered as one which provides means for compensating for erratic film speed by shifting the axis of the scanning beam or raster in a direction parallel to that of the film travel, such that the scanning beam may be "advanced" or "retarded" insofar as its positioning with respect to the film is concerned when the film momentarily speeds up or slows down. Hence, the invention is applicable in both instances of scanning in the direction of film travel in accordance with the applicant's system disclosed in his co-pending application and the conventional system of scanning transversely of the film strip.

Having thus described my invention, what I claim as new and desire to secure by Letters Patent is:

1. Apparatus for scanning continuously moving motion picture film having normally equi-spaced, rectangular apertures adjacent its edge, which comprises a film path; means for providing a substantially rectangular, stationary beam of light toward said film path such as to intercept such film in line with its apertures, said light beam having a cross-sectional area no larger than one of such apertures; light-sensitive means disposed in light-receiving relationship to said beam-providing means, such that the output of said light-sensitive means comprises a pulse for each such aperture, said pulse having a sloped portion; a source of signals of substantially constant repetition rate; each normally occurring during a specified part of said sloped portion; a phase-comparison circuit having a first input, a second input and an output; means for coupling said light-sensitive means to said first input; means for coupling said signal source to said second input; the output of said circuit being a measure of the time relationship of said pulses and said signals whereby to indicate any deviation of the rate of travel of such film from a predetermined rate with respect to said signals.

2. In combination with the apparatus of claim 1, a cathode ray tube for scanning such film; means for deflecting a beam in said tube between predetermined points; said deflecting means being energized by signals corresponding to said signals from said source.

3. Apparatus as defined by claim 2 including electrical means for shifting the axis of such beam in a direction parallel to that of film travel; and means coupling the output of said circuit to said beam-shifting means, such as to shift such beam in a manner to compensate for erratic film travel rate.

References Cited in the file of this patent

UNITED STATES PATENTS

| | | |
|---|---|---|
| 2,523,156 | Somers | Sept. 19, 1950 |
| 2,525,891 | Garman et al. | Oct. 17, 1950 |
| 2,585,865 | Somers | Feb. 12, 1952 |
| 2,818,466 | Larson | Dec. 31, 1957 |

FOREIGN PATENTS

| | | |
|---|---|---|
| 157,992 | Australia | Aug. 2, 1954 |

OTHER REFERENCES

"Continuous Film Scanner for TV," Electronics, July 1951, pages 114–116.